April 24, 1934.   R. S. DUDLEY   1,956,436
SAFETY SIGNAL LIGHT
Filed March 21, 1932
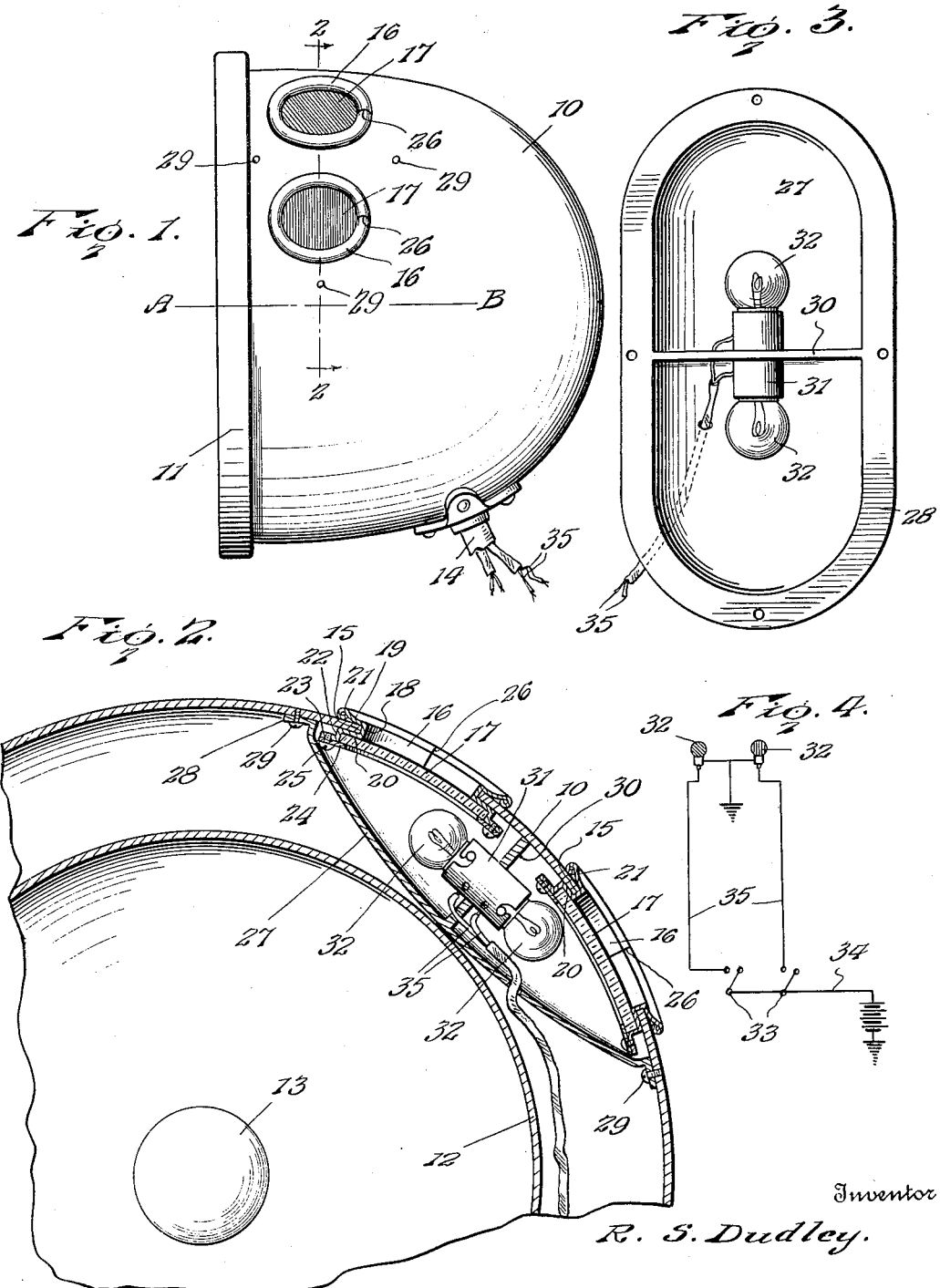
Inventor
R. S. Dudley.
By Lacey & Lacey, Attorneys Patented Apr. 24, 1934                                                                                         1,956,436

UNITED STATES PATENT OFFICE 1,956,436

SAFETY SIGNAL LIGHT

Robert S. Dudley, Chicago, Ill.

Application March 21, 1932, Serial No. 600,258

2 Claims. (Cl. 177—329)

This invention relates to automotive signal lights and has for an object to provide an automobile headlight equipped with preferably a red and a green signal light juxtaposed on the side of the casing by means of which a driver may signal his intended movements to another driver approaching an intersection, as well as to pedestrians, the green light, for example, being switched on to signal an approaching driver to go ahead, while the red light may be switched on to warn an approaching driver to stop.

A further object is to provide a novel signal light assembly which may be easily and quickly applied to headlights and which will not interfere with the normal functioning of the headlights to illuminate the road.

A further object is to provide a simple, inexpensive, and durable signal light assembly which will embody a few parts, that will not rattle in use, and will not easily get out of order.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawing forming part of this specification.

Figure 1 is a side elevation of a headlight equipped with signal lights constructed in accordance with my invention, Figure 2 is an enlarged crosss section through the lights taken on the line 2—2 of Figure 1, Figure 3 is an enlarged front elevation of the reflector and lamp holder for the signal lights, and Figure 4 is a diagrammatic view showing the circuit wiring for the signal lights.

Referring now to the drawing in which like characters of reference designate similar parts in the various views, a headlight of conventional form is shown comprising a casing 10, lens holder 11, reflector 12, lamp bulb 13, and flexible cable 14 for the conductor wires, these parts being of any preferred construction.

In carrying out the invention I form two juxtaposed openings 15 in the side of the casing 10 above the axis of light projection A—B and preferably near the lens holder 11. Each opening is adapted to receive a split ring holder 16 having colored glass lens 17, the upper lens preferably being green, while the lower is preferably red.

Each split ring holder is preferably formed of resilient material and is preferably formed U-shaped in cross section, as best shown in Figure 2, to provide a metal rim 18 to engage the edge of the opening 15 and spaced flanges 19 and 20 to receive therebetween the marginal portion of the casing at the opening. The outer flange is preferably beaded or rolled at the edge, as shown at 21, while the inner flange is offset to provide an annulus 22 and a rim flange 23. The glass lens 17 is of sufficient diameter to nicely fit within the enclosure of the annulus 22 and be supported upon the flange 20 and is preferably confined in place by a ring 24 which may be attached at spaced points to the rim flange 23 by screws 25.

Each holder, as above stated, is formed of resilient material and is split as shown at 26 in Figure 1 to permit of the holder being contracted sufficiently to be inserted in the opening 15 whereupon the glass lens may be applied and secured by the retaining ring 24.

A substantially oval metal reflector 27 is disposed back of the colored lenses 17 and is provided with a marginal flange 28 through which securing screws 29 may be passed into the casing 10 to removably secure the reflector in place. The reflector is provided centrally with a transverse partition wall 30 which divides the reflector into two substantially equal compartments, the partition wall being of sufficient height to extend to the casing 10.

Preferably a lamp socket 31 of the type open at both ends is secured in a suitable opening in the partition wall midway between the ends thereof and an incandescent lamp bulb 32 is secured in each end of the socket to extend into a corresponding compartment of the reflector 29 back of a corresponding lens 17. By referring to Figure 2 it will be seen that due to the semi-elliptical curvature of the reflector 27 the rays from the lamp bulbs 32 will be thrown upwardly as well as outwardly to most effectively signal approaching vehicles and pedestrians.

For energizing the signal lights independently of each other it will be seen, by referring to Figure 4, that switches 33 are interposed in the battery circuits 34 and 35 to the signal bulbs 32. These switches may be of any preferred form, lever type, or push button type, and may be located on the instrument board or on the steering post, or at any other convenient location so as to be readily operated by the driver. In either day or night operation, the driver may close the switch 33 corresponding to the desired colored light he wishes to use as a signal to approaching vehicles or pedestrians. In the event he wishes to signal an approaching vehicle to go ahead that he is going to stop, he signals the approaching vehicle with the green light. In the event he wishes to warn an approaching vehicle to stop that he is going to go ahead, he signals with the red light. Of course the signals may be used to indicate any desired intentions, the above being given by way of example of one particular use.

While it is stated above, the lenses 17 are colored, it will be understood that if desired the lenses may be clear while the lamp bulbs 32 are colored to impart the desired colored flash or ray.

In order to remove burned out bulbs 32 it is simply necessary to remove the lens and reflector 12 of the headlight whereupon the screws 29 may be readily removed to detach the reflector 27 for removal from the headlight. After renewal of the burned out bulb, the reflector 27 may be replaced and the screws 29 screwed tight whereupon the headlight reflector 12 and the lens thereof may be replaced in the usual and well known manner.

It will be seen that by virtue of the spring action of the resilient split ring holders 16 the holders will fit tight in the openings 15 so that rattling will be prevented and this anti-rattling feature may be greatly promoted if the lens seating flanges 20 are soldered, spot welded, or otherwise permanently secured to the headlight casing 10.

It will be noted that the signal lamp reflector 27 is of such depth at its center as to nicely clear the headlight reflector 12 and the headlight casing 10 so as not to disturb the normal function of the headlights in illuminating the road.

It will be seen that the device may be readily applied to headlights now in use having sufficient space between the reflector and the outer casing by simply cutting out the two openings 15 and forming the openings for the screws 29 of the signal light reflector 27.

From the above description it is thought that the construction and operation of my invention will be fully understood without further explanation.

What is claimed is:

1. The combination with an automotive headlight casing having openings in that side which is toward the outside of the vehicle to which the headlight is applied, of lenses closing said openings, a reflector secured to the inside of the casing in proximity to the lenses and outside of the usual reflector of the headlight and forming with the casing a closed signal chamber, a partition dividing said chamber into two compartments corresponding respectively to the lenses, and signal lamps extending into said compartments to illuminate the respective lenses.

2. The combination with an automotive headlight, of a pair of juxtaposed lenses secured in openings formed in the headlight casing above the axis of light projection thereof and near the front of the casing at that side thereof which is toward the outside of the vehicle to which the headlight is applied, a reflector removably secured to the inner side of the casing outside of the usual headlight reflector and of substantially semi-elliptical longitudinal section, a partition disposed transversely of the reflector at the point of its greatest depth and adapted to engage the headlight casing between said lenses, the reflector and partition being in contact with the headlight casing throughout their edges to form a closed signal chamber and divide the chamber into two separate compartments corresponding to the lenses, and lamps carried by the partition and extending within the respective compartments to illuminate the corresponding lenses.

ROBERT S. DUDLEY. [L. S.]